United States Patent [19]

Nakanishi et al.

[11] Patent Number: 4,519,854
[45] Date of Patent: May 28, 1985

[54] PROCESS AND APPARATUS FOR HEAT TREATMENT OF STEEL MATERIAL SUCH AS OF SOFT STEEL OR THE LIKE

[75] Inventors: Yasuo Nakanishi, Iruma; Kazunori Sakamoto, Kawagoe; Giichi Ando, Kawagoe; Teruoki Watanabe, Kawagoe, all of Japan

[73] Assignee: Honda Giken Kogyo Kabushiki Kaisha, Tokyo, Japan

[21] Appl. No.: 585,877

[22] Filed: Dec. 29, 1983

Related U.S. Application Data

[63] Continuation of Ser. No. 925,690, Jul. 18, 1978, abandoned.

[30] Foreign Application Priority Data

Jul. 21, 1977 [JP] Japan ............................ 52-86602

[51] Int. Cl.³ .............................................. B23K 1/04
[52] U.S. Cl. ........................................ 148/127; 148/14; 148/18; 228/200
[58] Field of Search ................ 148/16, 16.7, 18, 20.6, 148/134, 144, 127, 153, 155, 157, 14; 266/130–133, 254, 255, 257, 259; 228/263.15; 428/677, 683

[56] References Cited

U.S. PATENT DOCUMENTS

| | | | |
|---|---|---|---|
| 2,297,357 | 9/1942 | Kelley | 148/127 |
| 2,633,633 | 4/1953 | Bogart et al. | 148/127 |
| 2,987,815 | 6/1961 | Zeller | 228/200 |
| 3,016,606 | 1/1962 | Douglas | 148/127 |
| 3,112,388 | 11/1963 | Wiant | 228/46 |
| 3,290,030 | 12/1966 | Goehring | 266/257 |
| 3,562,026 | 2/1971 | Massey | 148/18 |
| 3,615,920 | 10/1971 | Talento | 148/127 |
| 3,730,502 | 5/1973 | Shutt, Jr. | 148/144 |
| 3,867,212 | 2/1975 | Dromsky | 148/127 |
| 4,294,395 | 10/1981 | Nayar | 228/263.15 |

FOREIGN PATENT DOCUMENTS

| | | | |
|---|---|---|---|
| 448683 | 5/1948 | Canada | 148/127 |
| 2073255 | 10/1981 | United Kingdom | 148/134 |

OTHER PUBLICATIONS

Tennenhouse, "Control of Distortion", *Welding Journal*, Oct. 1971, pp. 701-711.

*Primary Examiner*—Peter K. Skiff
*Attorney, Agent, or Firm*—Armstrong, Nikaido, Marmelstein & Kubovcik

[57] ABSTRACT

A process and apparatus for heat treatment of a steel article made of soft steel or the like comprising heating the steel article to a brazing temperature of 1100°–1200° C., then cooling the steel article in a furnace to a temperature of about 570°–720° C., and thereafter rapidly cooling the article. The article is heated to brazing temperature in an oxidation-free atmosphere and is also cooled in an oxidation-free atmosphere. The article can be rapidly cooled by contact with a surface pretreatment solution.

5 Claims, 8 Drawing Figures

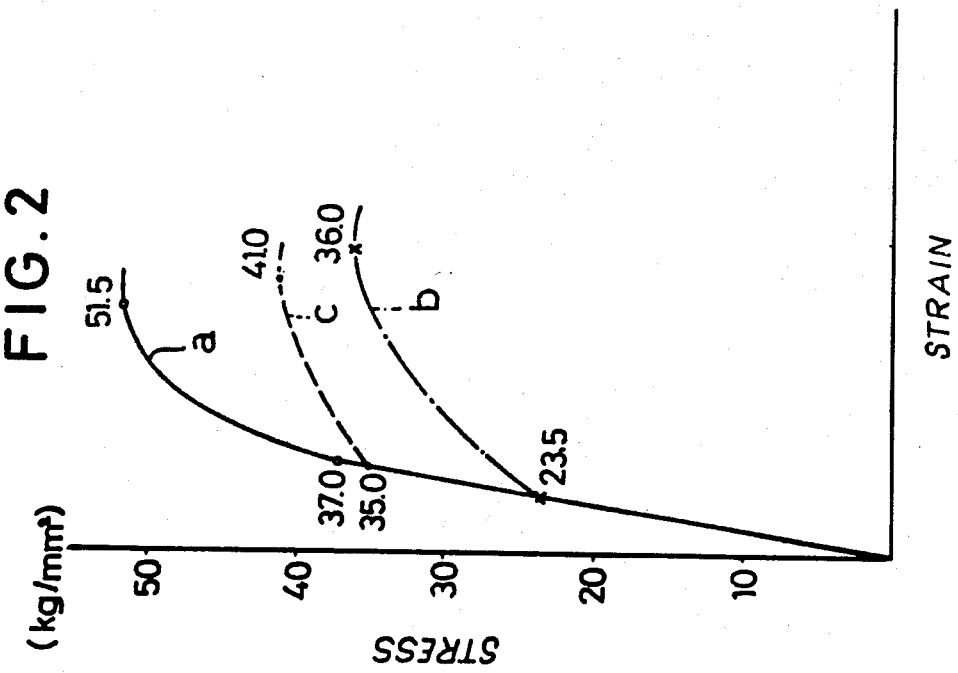
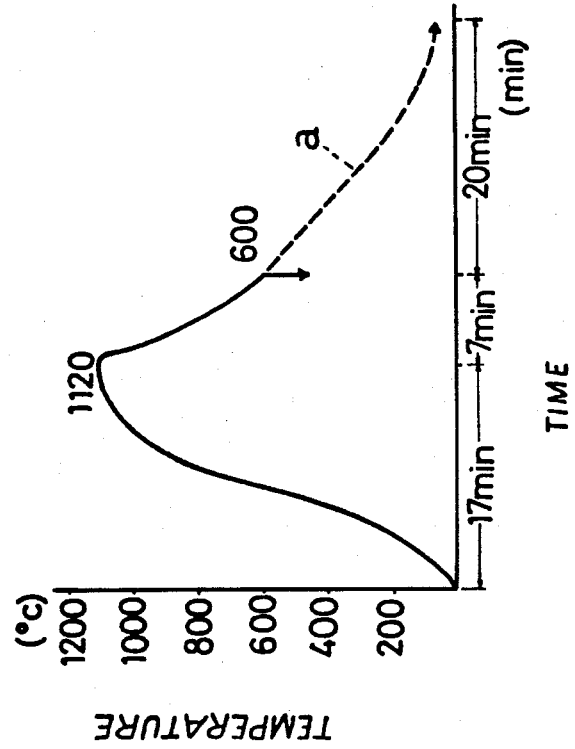

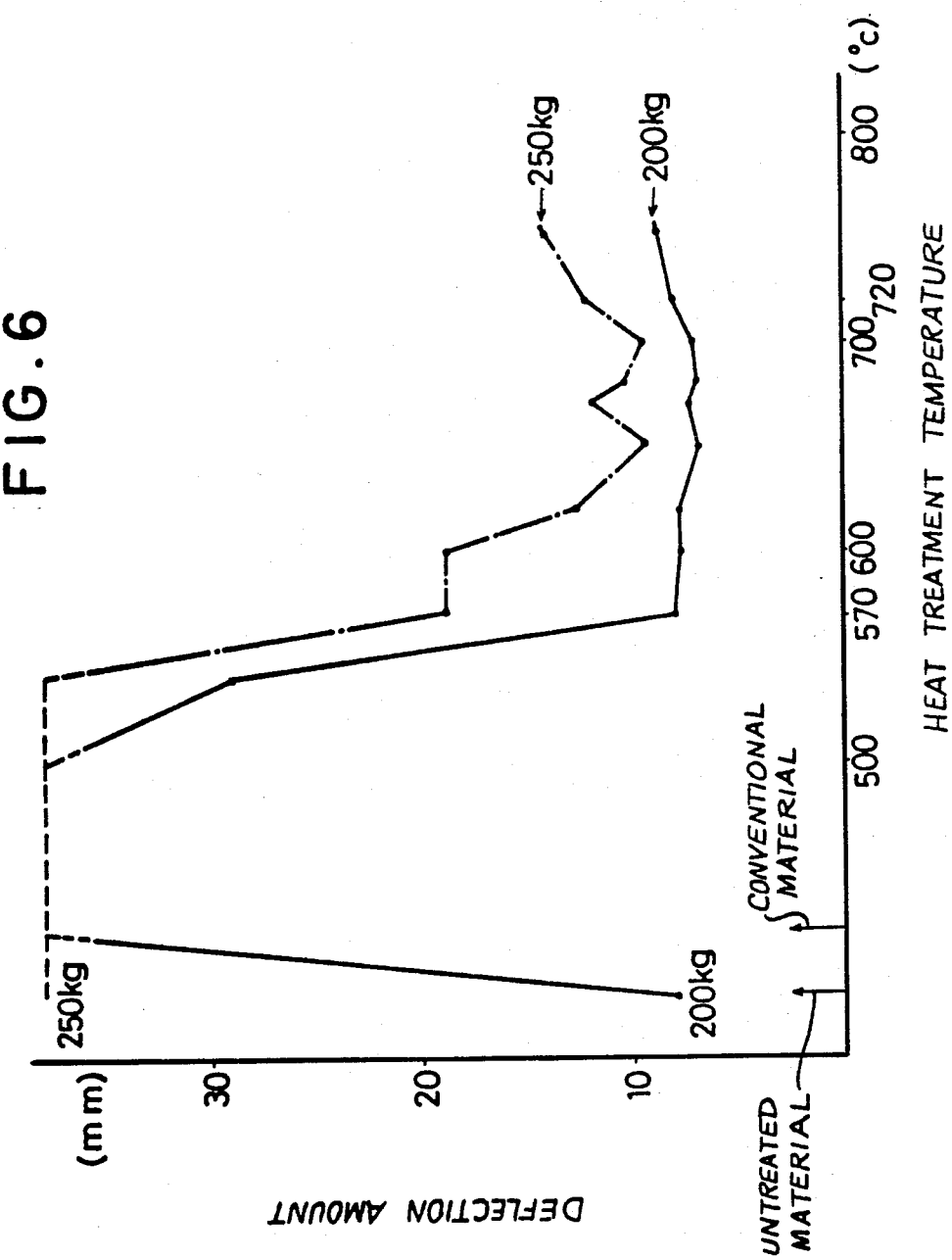

PROCESS AND APPARATUS FOR HEAT TREATMENT OF STEEL MATERIAL SUCH AS OF SOFT STEEL OR THE LIKE

This is a continuation of application Ser. No. 925,690, filed July 18, 1978, abandoned.

FIELD OF THE INVENTION

This invention relates to a process for heat treatment of a steel material, such as of soft steel, or the like and to an apparatus for the heat treatment.

BACKGROUND

It has been conventional in manufacturing various kinds of steel materials subjected to a brazing treatment that the steel material is heated to a temperature of about 1100°–1200° C. for effecting a copper solder brazing treatment, using a converted gas, decomposed ammonia gas or the like as the atmosphere in the furnace, and thereafter gradually cooling the steel in the furnace to room temperature as shown by furnace cooling curve a in FIG. 1.

The resultant heat-treated product is lower in mechanical properties, such as fatigue strength, bending strength as compared to the untreated steel material before the brazing treatment. Also, the product is comparatively weak in tensile strength at its soldered portion.

Therefore, in order to produce a product having the required mechanical properties after the heat treatment, it has been necessary for the product to have increased thickness to use a raw material having higher mechanical properties. This leads to the disadvantage of increase in weight of the product, higher cost, and the like.

SUMMARY OF THE INVENTION

An object of the invention is to provide a process for heat treatment of steel in which the foregoing disadvantages can be overcome and in which a steel material subjected to a brazing treatment can be obtained which has high bending strength at its soldered portion and is extremely improved in mechanical properties as compared to the untreated material before the brazing treatment.

The invention is characterized in that steel material such as soft steel or the like after being heated for brazing is furnace cooled to a temperature of about 570°–720° C. and thereafter is rapidly cooled.

BRIEF DESCRIPTION OF THE DRAWING

FIG. 1 is a graph showing a heat treatment curve of one example of the heat treatment process of this invention as compared to that of a conventional process.

FIGS. 2 and 3 are graphs showing mechanical properties of materials treated according to this invention in comparison with other materials.

FIGS. 5 and 6 are graphs showing the relation between treatment temperatures and bending properties.

DETAILED DESCRIPTION

A rear fork for a motorcycle which is made of a steel material including C of a range of 0.02–0.85% has cold strips of copper solder applied to its joining portions for obtaining a material to be treated. This material is introduced into a preliminary heating chamber within a furnace having an oxidation-free atmosphere, such as a converted gas or the like, for undergoing a preliminary heating. Then, the material is transferred to the main portion of the heating furnace and is heated to a temperature of 1100°–1150° C. for 2–3 minutes, so that the solder is melted and fills the joining portion. Then, the article is introduced in a furnace cooling chamber of water jacket type for being subjected to furnace cooling. The furnace cooling is so carried out for a short period as to stop when the material reaches the desired temperature of about 570°–720° C. i.e. below the $A_1$ transformation point thereof. Then, the article is introduced in a rapid cooling chamber for being subjected to a rapid cooling treatment by dipping or the like in water or the like, and the treatment according to the invention is then completed. The heat treatment conditions according to a specific example of the foregoing heat treatment process is shown in solid lines in FIG. 1, and it is characterized in that the material is rapidly cooled from a temperature of about 600° C.

The treated material, thus obtained, by the process of the invention is compared to a treated material obtained by a conventional process, that is, one which is furnace cooled continuously to a normal temperature as shown by dotted lines in FIG. 1, and an untreated material before treatment in respect of hardness.

The results thereof are as shown in the following Table 1.

TABLE 1

|  | SPCC 0.07% C | SPCB 0.06% C | STXMI3A 0.10% C |
| --- | --- | --- | --- |
| Untreated material | H.B. 63 | H.B. 59.5 | H.B. 67 |
| Treated Material by Conventional Process | H.B. 43.5 | H.B. 48 | H.B. 42 |
| Treated Material by This Invention Process | H.B. 69.5 | H.B. 65 | H.B. 69.5 |

As clear from the above Table, the material obtained by the conventional heat treatment process becomes reduced in hardness as compared to the untreated material before treatment, while the material obtained by the process of this invention is significantly improved in hardness as compared with the untreated material.

Figure 3:
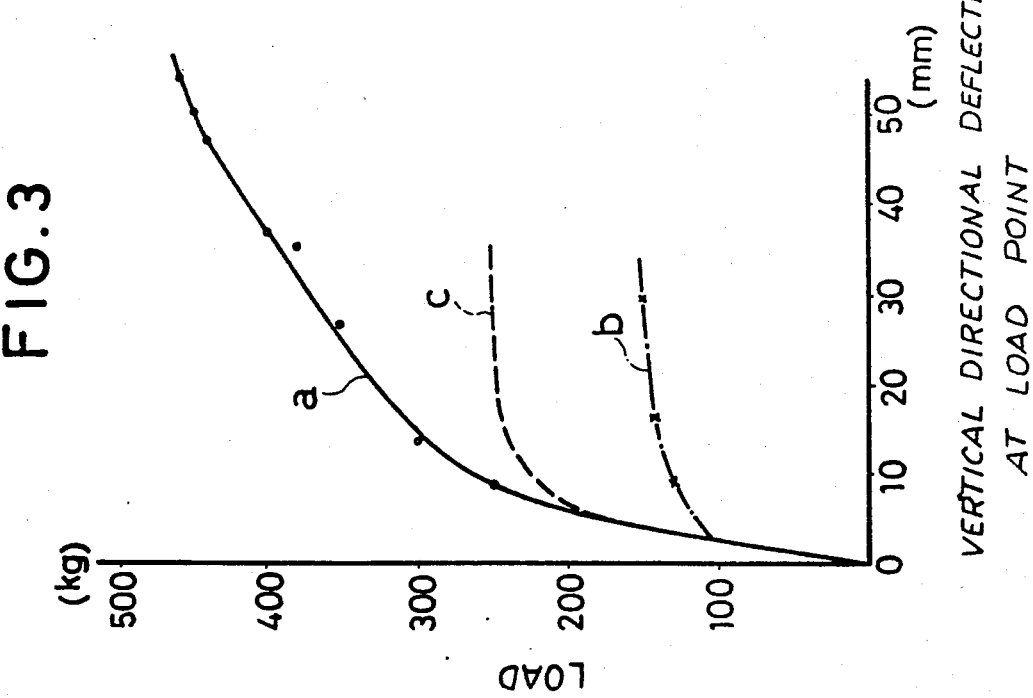

Other mechanical properties of the treated material obtained by the process of this invention are shown by curves a in FIGS. 2 and 3, respectively, and for the sake of comparison, the corresponding mechanical properties of the material treated by the conventional process and those of the untreated material itself are shown by curves b and c, respectively. As is clear therefrom, the material treated by the process of the invention is excellent.

Figure 4:
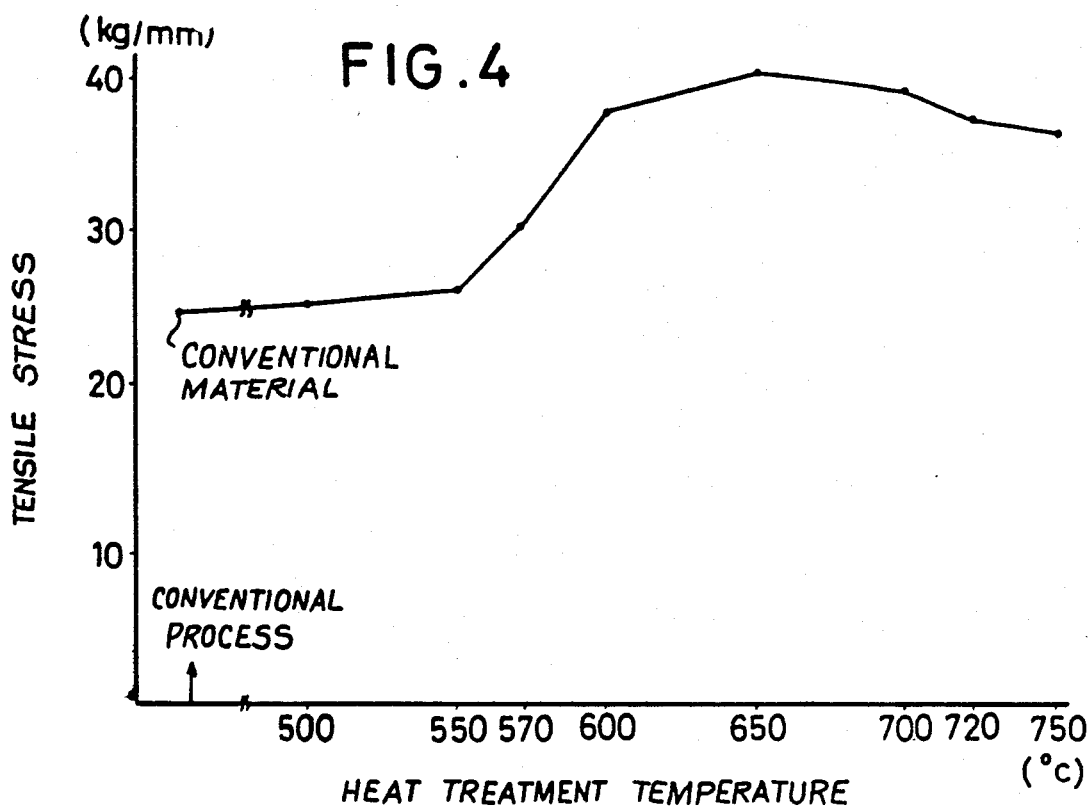
FIG. 4 is a graph showing the relation between treatment temperature and tensile strength at a brazed portion.

According to the process of this invention, as compared with the conventional process, not only is the treated material improved as regards various mechanical properties of the material in itself but also the portions thereof joined by the solder are extremely high in bending strength. The results thereof are shown in FIG. 4. In particular, FIG. 4 shows the case where butt joined portions (0.05 mm in gap) of SPCC steel materials of 20 mm in thickness are joined together by a copper solder, and a product having a large tensile strength capable of resisting a tensile force above about 30 Kg/mm$^2$ can be obtained by the process of this invention, whereas the product obtained by the conventional process only has a maximum tensile strength of about 25 Kg/mm$^2$.

Figure 5:
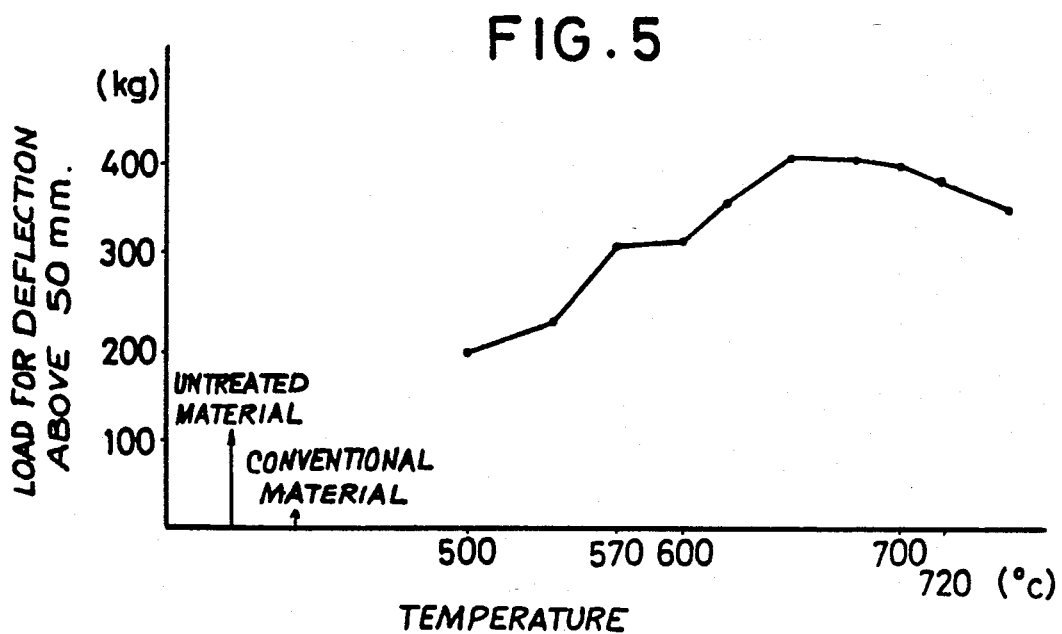

The process of the invention is characterized in that after the material is heated for brazing, it is then furnace cooled to 570°–720° C. and then is rapidly cooled and this is especially significant as demonstrated in FIGS. 5 and 6. FIG. 5 shows comparison test results obtained by a pipe bend test which is carried out by measuring the load at the time when deflection exceeds 50 mm, for materials (a) which have been furnace cooled respectively to a temperature within the foregoing temperature range and to a temperature beyond that range, respectively, and thereafter have been rapidly cooled, (b) material treated by the conventional process and (c) untreated material. It can be seen from FIG. 5 that a product having high bending strength can be obtained by the process of this invention.

FIG. 6 shows the relation between the load and the amount of deflection for each of the materials obtained in substantially the same manner, by the foregoing heat treatment conditions, and it can be seen therefrom that a product which has excellent bending strength in respect of large loads such as above 200 Kg can be obtained by the process of this invention. The rapid cooling is such that if carried out from a temperature above 725° C., rapid cooling control becomes difficult and strain of the treated material and that of the soldered portion thereof becomes large, and thus is not desirable.

According to the process of this invention, a treated material having excellent mechanical properties can be obtained if a steel material of 0.1–0.8% in C content is furnace cooled from any desired heat treatment temperature for brazing, that is, usually from about 1120° C. to about 650° C. within the range of 570°–720° C., for a comparatively short period, that is, about 5–10 minutes, and is then rapidly cooled.

From many experiments in which the process of the invention was carried out for respective various steel materials varied in C content it has been found that any steel material containing C in a range of 0.02–0.25% provides especially appropriate tensile strengths below 80 Kg/mm$^2$. Any steel material containing C above this amount is liable to become too high in hardness.

The rapid cooling treatment is carried out in such manner that the material is dipped into a liquid coolant such as water or the like, or the liquid is poured on the material, or the material is passed through a gaseous coolant atmosphere, and it is preferable that, in the case of liquid, the liquid is kept in a liquid temperature range of 5° to 45° C.

When a surface pretreatment solution such as a phosphate solution or the like is used as the coolant liquid, it is advantageous for the material to be treated to undergo a ground coating treatment simultaneously with the cooling treatment.

A specific example of the process for carrying out this invention will be described with reference to FIG. 7.

Figure 7:
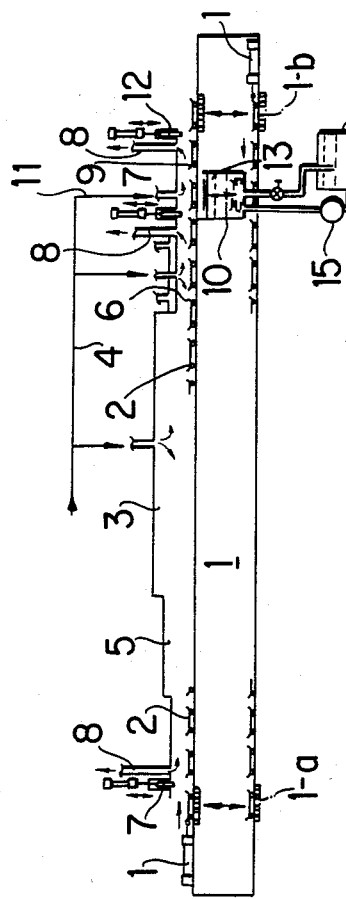
FIG. 7 is a front diagrammatical view showing one embodiment of apparatus according to this invention.

Referring to FIG. 7, numeral 1 denotes a conveyor for conveying trays 2 intermittently in the direction of the arrow by a pusher, and the conveyor is provided at its front end portion with an elevating mechanism 1-a for lifting up a tray 2 to a supply station, and at its rear end portion with an elevating mechanism 1-b for lowering the tray 2 to an initial position for being pushed by another pusher for feeding the tray. An elongated furnace 3 is provided above the upper surface of the conveyor and extends along the longitudinal direction thereof. The furnace 3 serves as the main heating chamber for effecting the melting of the solder to form the brazed joints of the article and the furnace has a front portion formed as a preliminary heating chamber 5 provided with an electrical resistance heater. A gas conduit 4 serves for introducing in the furnace 3 any desired oxidation-free gas, such as any converted gas as, for example, decomposed ammonia gas, nitrogen gas, reducing gas or the like. The conduit 4 is connected to the heating furnace 3 so that the preliminary heating and the heating for brazing of the material to be treated may be effected under an oxidation-free atmosphere.

A furnace cooling chamber 6 of water jacket type is connected to the rear end of the heating furnace 3. The rear end of the furnace cooling chamber 6 and the front end of the heating furnace 3 are provided with respective shutters 7, adapted to be opened and closed in conjunction with the intermittent feeding. Numeral 8 denotes gas exhaust pipes. It is intended that the furnace cooling of the material to be treated also be effected under the oxidation-free atmosphere. A cooling chamber 9 is connected to the rear end of the furnace cooling chamber 6, and a cooling tank 10 containing a coolant liquid, such as water or the like is mounted below the chamber 9. A gas inlet pipe 11 for introducing oxidation-free gas and a gas exhaust pipe 8 for discharging the oxidation-free gas are connected to the interior of the chamber 9, and there is provided at the rear end thereof a shutter 12 adapted to be opened and closed in conjunction with the intermittent feeding. Thus, the material to be treated is subjected to a cooling treatment under the oxidation-free gas atmosphere. Numeral 13 denotes an elevating mechanism whereby the tray 2 is received thereon for being lowered and raised so that the material within the tray 2 is immersed for a predetermined time in the coolant liquid for undergoing a rapid cooling treatment. Numeral 14 denotes a supply tank having a pump 15 connected to the coolant liquid tank 10 so that the liquid within the tank 10 may be partly replaced by fresh liquid, as occasion demands, so that the liquid temperature in tank 10 can be kept preferably at 5°–45° C. If any other coolant solution for surface pretreatment, such as aqueous phosphate solution or the like is used instead of water, the subsequent coating, that is, a phosphate pickling step can be omitted.

The heat treatment process by this apparatus will be explained as follows:

A rear fork for a motorcycle made of STKM 13A containing C below 0.25% is supplied at its respective joint portions with hard solder, such as copper solder, and the assembly is placed on a respective tray 2. A number of trays are fed one by one into the heating furnace 5 by being pushed intermittently in the direction of the arrow by the feed conveyor 1. The rear fork is moved toward the main chamber of the furnace after being subjected to a preliminary heating in the preliminary heating chamber 5, and in the main chamber the assembly is subjected to heating of 1100°–1150° C. for 2–3 minutes, whereby the solder is melted and fills each joining portion. After the heat treatment for brazing, the rear fok is conveyed to the furnace cooling chamber 6 for being furnace cooled. The furnace cooling is effected at a temperature of an optimum of about 650° C. (in a range of 570°–720° C.) below the $Ar_1$ transformation point so that the material will have low thermal deformation even with rapid cooling. Then, the rear fork which is cooled to the temperature in the furnace cooling stage is further conveyed intermittently and is introduced into the rapid cooling chamber 9, whereby the fork is rapidly cooled by being immersed for 30–60 seconds into the coolant liquid tank 10 containing water or the like under the oxidation-free atmosphere by being lowered by elevating mechanism 13. After completion of the rapid cooling treatment, the elevating mechanism 13 returns the fork to its original position. When the fork is elevated, the shutters 7, 12 are opened and the tray 2 is taken out of the chamber 9 by the intermittent feed and at the same time a fresh tray 2 is introduced into the chamber 9, and after the shutters 7, 12 are again closed, the elevating mechanism 13 is operated to repeat the immersion treatment. The material taken out from the tray 2 is moved to the next treatment station, and the tray 2 which is now empty is lowered to the lower stage position by the elevating mechanism 1-b of the conveyor 1, and at that position the tray 2 is supplied with fresh material to be treated, and the tray is conveyed to the supply station intermittently in the direction of the arrow, and is elevated to the upper stage by the elevating mechanism 1-a, for being introduced in the furnace by the intermittent feed. Thus, the heat treatment process of the invention is carried out by the intermittent feeding repeatedly.

If, in the foregoing rapid cooling treatment, an aqueous phosphate solution is used as the surface pretreatment solution, simultaneously with the rapid cooling treatment of the material, a coating can be formed on the surface thereof at a reaction temperature during the cooling progress. As occasion demands, the aqueous phosphate solution is partly or wholly replaced by fresh liquid in the supply tank 14, whereby adjustment in temperature, liquid density, pH value or the like can be made. The rapid cooling can be also carried out, instead of the foregoing immersion, by pouring the liquid or spraying the same on the article. In this case, instead of the liquid tank, a liquid dispensing means, such as a pouring mechanism or a spraying apparatus is provided on the upper surface of the chamber 9, so that the material can be rapidly cooled by applicaton of liquid. Alternatively, the rapid cooling can be effected by projecting a gaseous cooling agent into the chamber 9 or by other means. In the foregoing heat treatment, the furnace cooling from 1120° C. to about 600° C. is effected in 6–7 minutes.

Figure 8:
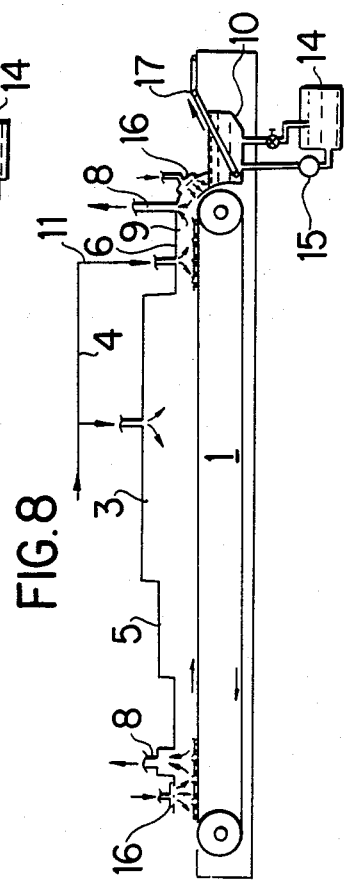
FIG. 8 is a front diagrammatical view showing another embodiment thereof.

FIG. 8 shows apparatus of another embodiment. At the inlet and outlet openings for the material there are provided, instead of the shutters, gas curtain means 16, comprising an oxidiation-free gas and the cooling tank 10 is mounted in such a manner that the surface of the liquid contained therein is overlapped or covered partly with the gas curtain flow from the rear outlet, so that the material can be introduced from the furnace cooling chamber 6 into the cooling tank 10 without being exposed to the external air in order to undergo the rapid cooling treatment or the rapid cooling and coating treatments. The tray 2 in conveyed continuously by endless belt conveyor 1 so that a continuous treatment may be carried out. Numeral 17 denotes a belt conveyor for removal of the material immersed in tank 10.

Thus, according to this invention, a steel material is cooled after heating for brazing to a temperature of about 570°–720° C. and is then rapidly cooled, so that the treated material will be improved in mechanical properties such as hardness and the like in comparison to steels obtained by the conventional process.

What is claimed is:

1. A process for preparing a brazed steel article from steel parts to be joined by solder which consists essentially of the steps of heating said parts with said solder to a brazing temperature of 1100°–1200° C., to effect joining thereof, followed by cooling the brazed steel article in a furnace to a temperature of about 570°–720° C. in 5–10 minutes and then rapidly cooling the brazed steel article, wherein said steel contains from 0.02 to 0.25% carbon.

2. A process as claimed in claim 1 wherein the heating to the brazing temperature is effected in an oxidation-free atmosphere.

3. A process as claimed in claim 1 wherein the rapid cooling is effected by contacting the steel with a liquid.

4. A process as claimed in claim 3 wherein the liquid has a temperature of 5°–45° C.

5. A process as claimed in claim 3 wherein the liquid is a phosphate solution.

* * * * *